United States Patent
Arbeitman et al.

(10) Patent No.: US 7,139,940 B2
(45) Date of Patent: Nov. 21, 2006

(54) METHOD AND APPARATUS FOR REPORTING GLOBAL ERRORS ON HETEROGENEOUS PARTITIONED SYSTEMS

(75) Inventors: Robert M. Arbeitman, Austin, TX (US); Douglas Marvin Benignus, Dime Box, TX (US); Arthur James Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 10/411,413

(22) Filed: Apr. 10, 2003

(65) Prior Publication Data

US 2004/0205413 A1 Oct. 14, 2004

(51) Int. Cl.
*G06F 11/00* (2006.01)
(52) U.S. Cl. .......................... 714/57; 714/48
(58) Field of Classification Search ............. 714/48, 714/57
See application file for complete search history.

(56) References Cited

U.S. PATENT DOCUMENTS

| | | | |
|---|---|---|---|
| 6,842,870 B1 * | 1/2005 | Austen et al. | 714/48 |
| 6,892,330 B1 * | 5/2005 | Lee | 714/48 |
| 6,918,059 B1 * | 7/2005 | Galuten et al. | 714/31 |

FOREIGN PATENT DOCUMENTS

| | | |
|---|---|---|
| JP | 05120064 | 5/1993 |
| JP | 07036762 | 2/1995 |
| JP | 10260946 | 9/1998 |
| JP | 2002312201 | 10/2002 |
| JP | 2002312202 | 10/2002 |
| JP | 2002323987 | 11/2002 |

OTHER PUBLICATIONS http://www.webopedia.com/TERM/B/backward_compatible.html. Aug. 15, 2002.*
U.S. Appl. No. 09/798,207, Ahrens et al., Method and System for Eliminating Duplicate Reported Errors in a Logically Partitioned Multiprocessor System, Mar. 1, 2001.
Tivoli Web Component Manager User's Guide, Version 1.1 IBM Japan, Oct. 2001GC88-9040-00, pp. 101-102.

* cited by examiner

*Primary Examiner*—Scott Baderman
*Assistant Examiner*—Joshua Lohn
(74) *Attorney, Agent, or Firm*—Duke W. Yee; Thomas E. Tyson; Gerald H. Glanzman

(57) ABSTRACT

A method, apparatus, and computer instructions for reporting global errors in a logical partitioned data processing system having a plurality of partitions running different types operating systems. Responsive to detecting a global error, a unique identifier is assigned to the global error. The unique identifier is sent to a service focal point. The unique identifier also is sent to the partitions. Error information from the partitions is reported to the focal point. The partitions send error information to the focal point in association with the unique identifier. The focal point identifies error information sent from the partitions for the global error using the unique identifier.

24 Claims, 4 Drawing Sheets

METHOD AND APPARATUS FOR REPORTING GLOBAL ERRORS ON HETEROGENEOUS PARTITIONED SYSTEMS

CROSS REFERENCE TO RELATED APPLICATIONS

The present invention is related to the following application entitled: "Method and System for Eliminating Duplicate Reported Errors in a Logically Partitioned Multiprocessor System," Ser. No. 09/798,207, filed Mar. 1, 2001, assigned to the same assignee, and incorporated herein by reference.

BACKGROUND OF THE INVENTION

1. Technical Field

The present invention related generally to an improved data processing system and in particular, to a method and apparatus for processing data. Still, more particularly, the present invention provides a method, apparatus, and computer instructions for reporting global errors on a logical partitioned data processing system having different types of operating systems.

2. Description of Related Art

A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

Each distinct OS or image of an OS running within the platform is protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

With respect to hardware resources in a LPAR system, these resources are disjointly shared among various partitions, themselves disjoint, each one seeming to be a stand-alone computer. These resources may include, for example, input/output (I/O) adapters, processors, and hard disk drives. Each partition within the LPAR system may be booted and shutdown over and over without having to power-cycle the whole system.

In a logical partitioned data processing system, a class of errors, called "local errors", are only reported to the assigned or owning partition's operating system. Failures of I/O adapters assigned to a single partition's operating system are examples of local errors. Global errors are a second class of errors that may occur in a logical partitioned data processing system. These types of errors are reported to each of the operating systems in the partitions because these types of errors can potentially affect each partition's operation. Global errors occur when failures in resources shared by multiple partitions occur. Power supply, memory, fan, host bridge, and processor failures are examples of global errors.

Reporting of global errors allows for repair actions. In current logical partitioned data processing system, different operating systems may run on different partitions. For example, AIX, OS/400 and LINUX may each run in a different partition in a logical partitioned data processing system. Servicing such a system can be difficult because of the different reporting processes employed by the different operating systems running on the partitions.

Therefore, it would be advantageous to have an improved method, apparatus, and computer instructions for reporting global errors in a logical partitioned data processing system in which different types of operating systems are present in the partitions.

SUMMARY OF THE INVENTION

The present invention provides a method, apparatus, and computer instructions for reporting global errors in a logical partitioned data processing system having a plurality of partitions running different types operating systems. Responsive to detecting a global error, a unique identifier is assigned to the global error. The unique identifier is sent to a service focal point. The unique identifier also is sent to the partitions. Error information from the partitions is reported to the focal point. The partitions send error information to the focal point in association with the unique identifier. The focal point identifies error information sent from the partitions for the global error using the unique identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
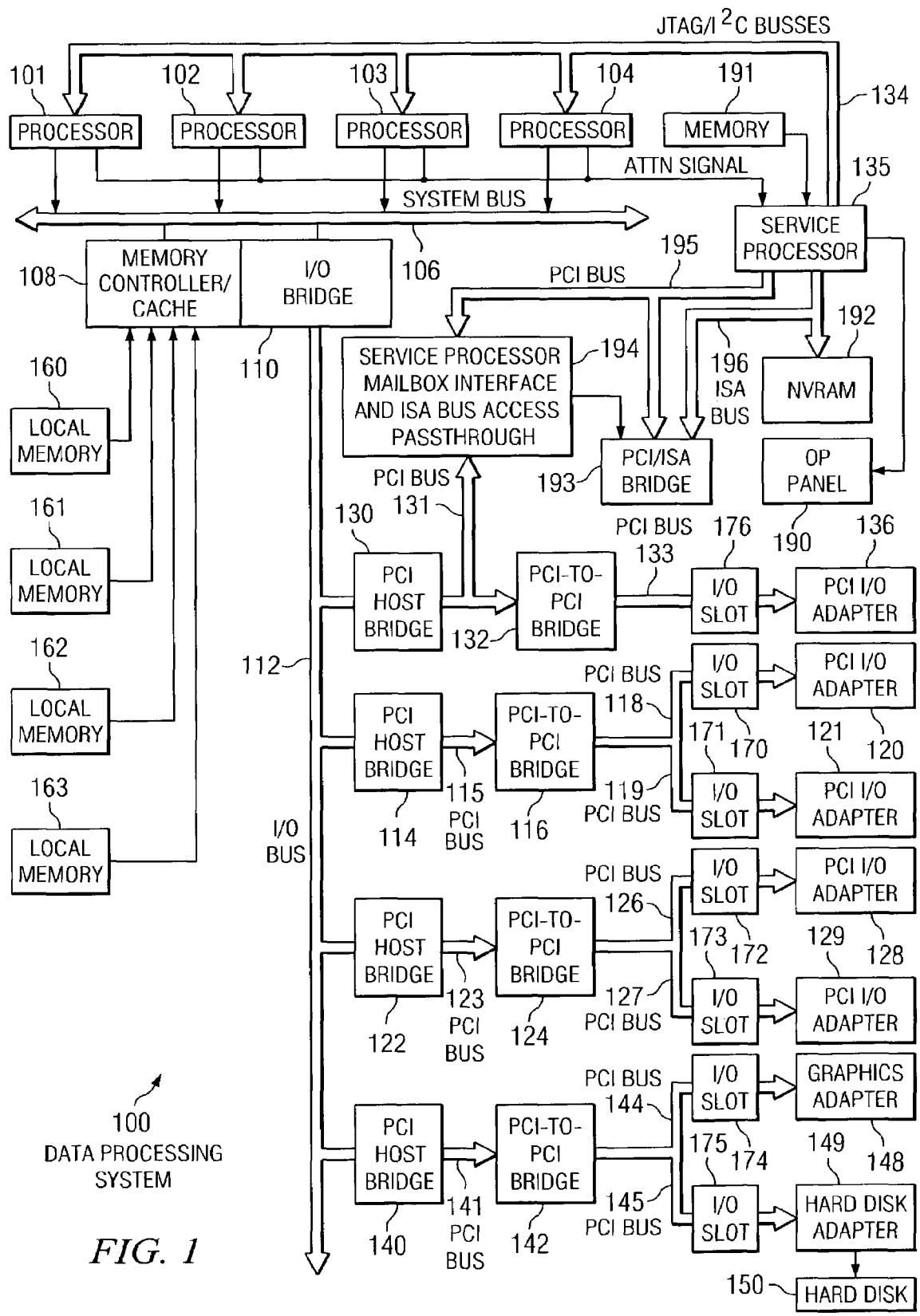
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCT I/O adapters 120–121, 128–129, 136, graphics adapter 148, hard disk adapter 149, each of host processors 101–104, and memory from local memories 160–163 is assigned to each of the three partitions. In these examples, memories 160–163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160–163, and I/O adapters 120, 128, and 129 may be assigned to logical partition P1; processors 102–103, some portion of memory from local memories 160–163, and PCI I/O adapters 121 and 136 may be assigned to partition P2; and processor 104, some portion of memory from local memories 160–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P1. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATS, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases host processors 101–104 for execution of the code loaded into local memory 160–163.

While host processors 101–104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
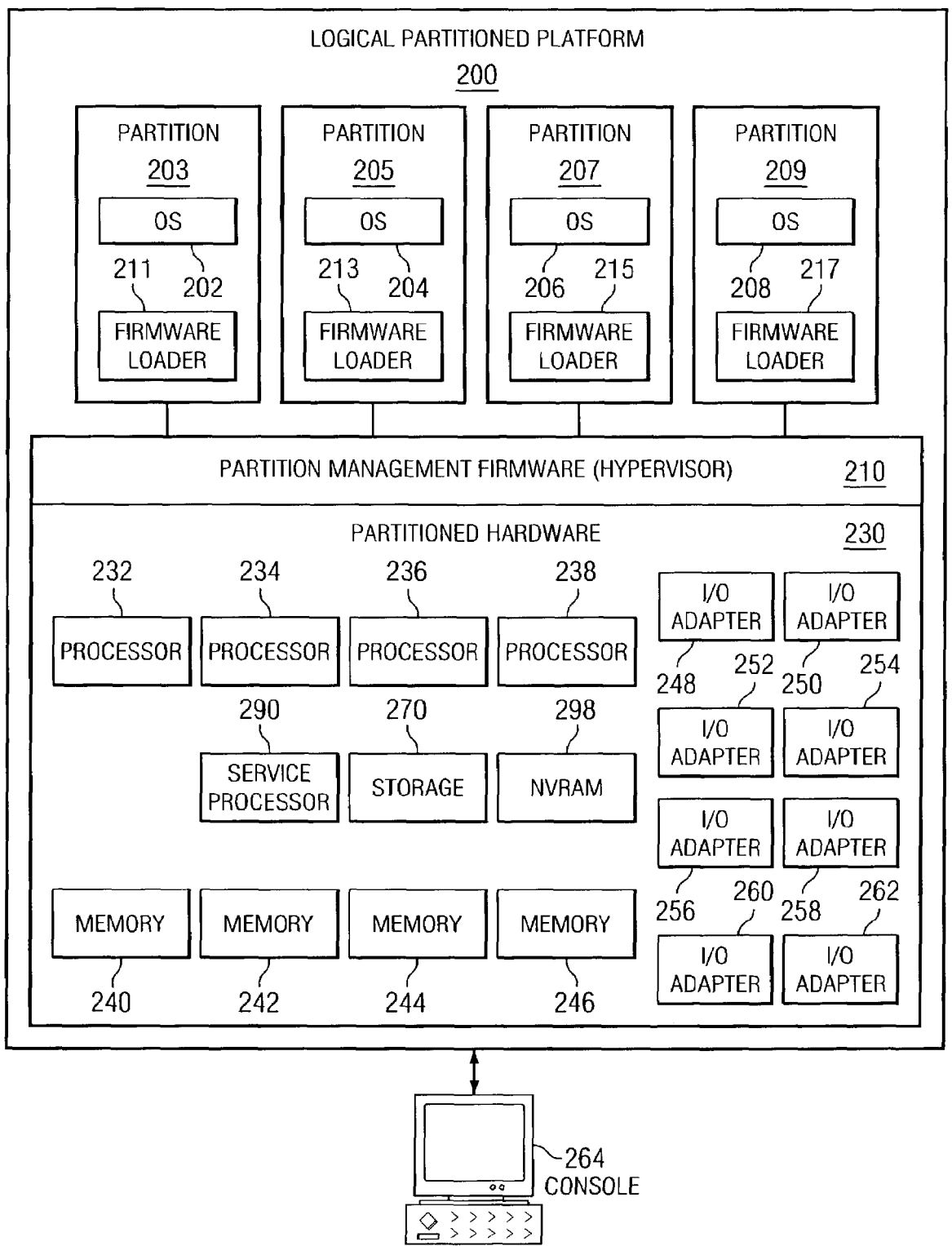
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

With respect to the reporting of global errors, a common service focal point may be employed to gather error reports from each of the operating systems in the different partitions. The serviceable events may then be displayed to a service person or other user. In these examples, the common service focal point may be, for example, a data processing system in communication with the logical partition data processing system. This common service focal point may be in a hardware management console, such as console 264 in FIG. 2. With respect to the different types of error reporting processes in the different operating systems, the present invention provides an improved method, apparatus, and computer instructions allowing the service focal point to correlate the error reports.

In the depicted examples, a unique set of serviceable IDs, also referred to as unique error IDs, are generated for each type of global error that may occur on a logical partitioned data processing system. The unique error ID is reported by the platform to the different operating systems, as well as to the service focal point. This unique error ID is included in the error report sent by the partitions to the service focal point. This unique error ID is used by the service focal point to put together a report for the global error. With the unique error ID, the service focal point is able to identify which reports correspond to which errors without having to use resources to analyze the reports and identify which ones correspond to a particular global error.

Figure 3:
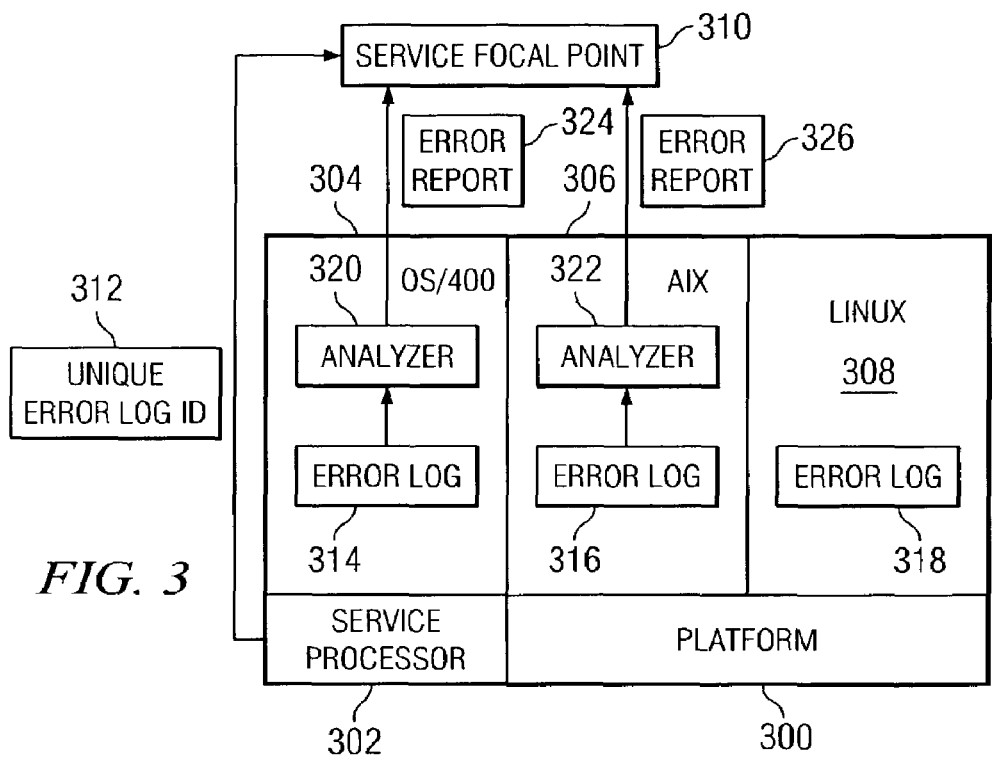
FIG. 3 is a diagram illustrating components used to report global errors in accordance with a preferred embodiment of the present invention.

Turning now to FIG. 3, a diagram illustrating components used to report global errors is depicted in accordance with a preferred embodiment of the present invention. The components illustrated in FIG. 3 may be implemented in data processing system such as data processing system 100 in FIG. 1.

In this example, platform 300 is a logical partitioned data processing system, which includes service processor 302 and partitions 304, 306, and 308. Partition 304 runs OS/400 as the operating system, partition 306 runs AIX as the operating system, and partition 308 runs LINUX as an operating system.

When global error occurs, platform 300 reports this global error to service focal point 310 through service processor 302. Service focal point 310 may be implemented using any data processing system in communication with platform 300. Service focal point 310 serves as a single location at which errors may be gathered and/or presented to a user or administrator.

The global error is reported as unique error ID 312 in which each possible type of global error is assigned a unique identifier. For example, if platform 300 detects a processor problem and a memory problem, a particular processor error ID 1256–7804 and a particular memory error 5678-1234 may be sent to service focal point 310. If platform 300 detects another memory problem of the same type, but in a different area of memory, service processor 302 may report 5678-1234 to identify this additional memory error. Common service focal point 310 tracks these unique error IDs and uses them to group any further error reports received from the different partitions.

Further, this unique error ID also is reported to each of the platforms in errors logs 314, 316, and 318. Additionally, a location code that distinguishes field replaceable units (FRUs) apart from each other, also may be included with unique error ID 312 sent to service focal point 310, or reported in addition to the unique error ID in the error logs.

Operating system 304 and operating system 306 are able to use the unique error ID, placed into error logs 314 and 316. In these examples, analyzer 320 and analyzer 322 place operating system specific information around the unique error ID to generate error reports 324 and 326, which are sent to service focal point 310. This additional information may include, for example, the state of software at the time the error was reported. If a partition is unable to use or not enabled to use the unique error ID, normal reporting occurs. In this example, partition 308 runs an operating system that does not use the unique error ID.

Service focal point 310 receives error reports 324 and 326. These error reports are examined to determine whether a unique error ID is present. If a unique error ID is present, this unique error ID is used to generate a common or single report for the global error.

In these examples, the set of unique error IDs for the different global errors is generated by platform 300. Further, these unique error IDs could be pre-generated and sent to platform 300. An additional benefit of the unique error IDs is that these unique error IDs may be used by service focal point 310 to distinguish between local errors and global errors. Local errors reported by the operating systems do not contain unique error ID because they are assigned only for global errors. With these unique error IDs, service focal point 310 is not required to filter out data and determine which serviceable events reported by partition are global errors.

Figure 4:
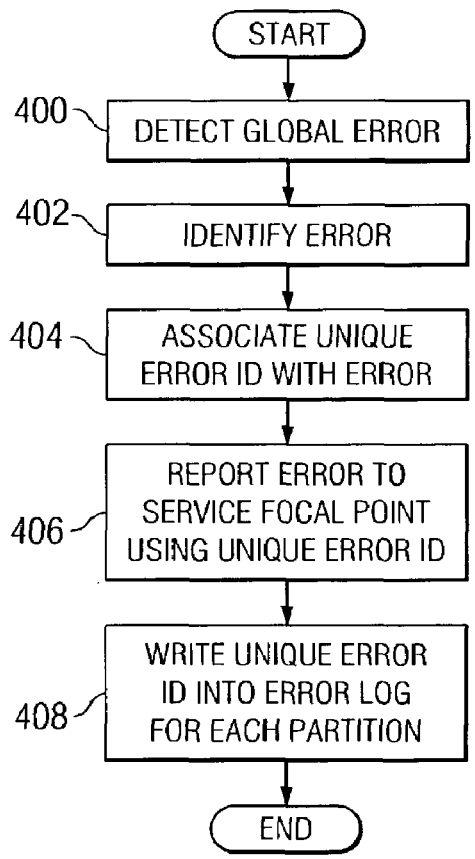
FIG. 4 is a flowchart of the process for processing an error in accordance with a preferred embodiment of the present invention.

Turning now to FIG. 4, a flowchart of the process for processing an error is depicted in accordance with a preferred embodiment of the present invention. The process illustrated in FIG. 4 may be implemented in a service processor, such as service processor 302 in FIG. 3.

The process begins by detecting a global error (step 400). The error is identified (step 402). In identifying the error, the process may determine whether the error is, for example, a memory error or a processor error. Further, an identification of the FRU also may be made in this step. Thereafter, a unique error ID is associated with the error (step 404). This error is then reported to the service focal point (step 406). Further, the unique error ID is written into the error log for each partition (step 408). Additionally, the process also may place the FRU identifier into the error log, with the process terminating thereafter.

Figure 5:
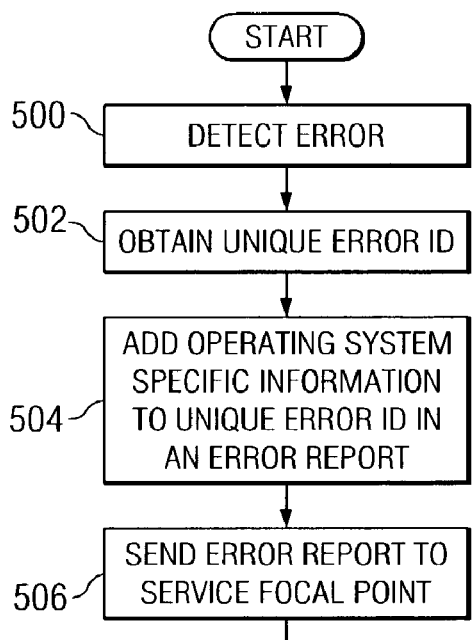
FIG. 5 is a flowchart of a process for generating an error report in accordance with a preferred embodiment of the present invention.

Turning next to FIG. 5, a flowchart of a process for generating an error report is depicted in accordance with a preferred embodiment of the present invention. The process illustrated in FIG. 5 may be implemented in an partition, such as the OS/400 operating system in partition 304 in FIG. 3.

The process begins by detecting an error in the error log (step 500). The unique error ID and other error information are detected from the error log (step 502). Operating specific information is added to the unique error ID in an error report (step 504). Thereafter, the error report is sent to the service focal point (step 506), with the process terminating thereafter.

Figure 6:
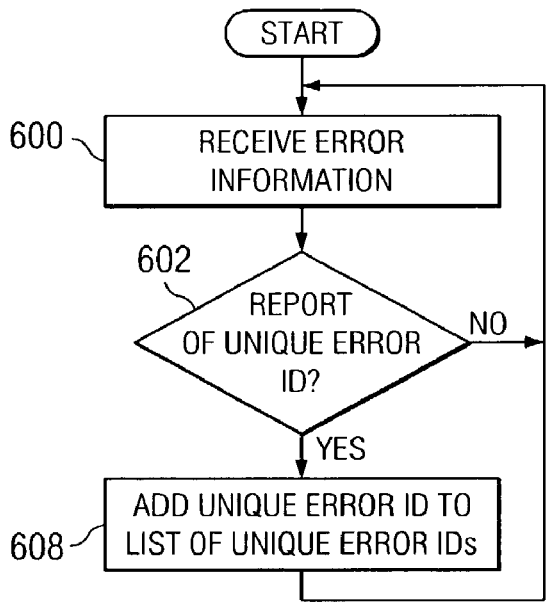
FIG. 6 is a flowchart of a process for processing error reports in accordance with a preferred embodiment of the present invention.

With reference now to FIG. 6, a flowchart of a process for processing error reports is depicted in accordance with a preferred embodiment of the present invention. The process illustrated in FIG. 6 may be implemented in a service focal point, such as service focal point 310 in FIG. 3.

The process begins by receiving error information (step 600). A determination is made as to whether the error information is a unique error ID (step 602). If the error information is not a unique error ID, the error information is an error report of a local error sent by operating systems within a partition to the service focal point.

With reference again to step 602, if the error information is a unique error ID, this unique error ID is added to a list of unique error IDs (step 608). In this manner, error reports may be collated for processing and presentation by the service focal point.

Figure 7:
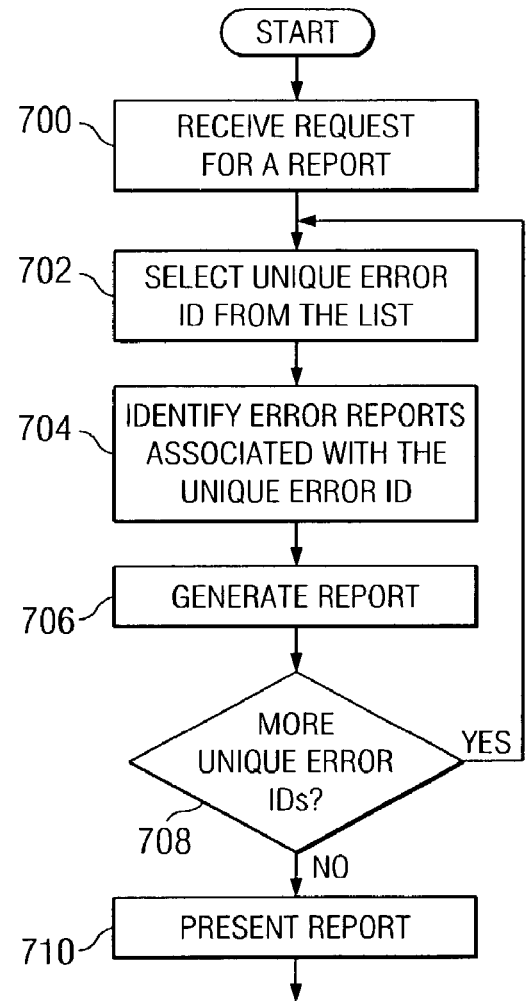
FIG. 7 is a flowchart of a process for generating a report from a set of error reports in accordance with a preferred embodiment of the present invention.

Turning now to FIG. 7, a flowchart of a process for generating a report from a set of error reports is depicted in accordance with a preferred embodiment of the present invention. The process illustrated in FIG. 7 may be implemented in a service focal point, such as service focal point 310 in FIG. 3.

The process begins by receiving a request for a report (step 700). This request may be generated by a user or may be generated by software, depending on the particular implementation. This report may include information about one or more errors and includes information from the different operating systems.

Next, a unique error ID is selected for processing (step 702). Thereafter, error reports associated with the unique error ID are identified (step 704). A report is generated using information from the different error reports received from the different operating systems in the logical partitioned data processing system (step 706). A determination is then made as to whether additional unique error IDs are present for processing (step 708). If additional unique error IDs still need to be processed, the process returns to step 702. Otherwise, the report is presented (step 710), with the process terminating thereafter. Further, in step 710, this step may be implemented to allow a user to select either a platform generated error, having a unique error ID, or a locally generated error, having an operating system generated error to allow a user to display details of the errors.

Thus, the present invention provides a method, apparatus, and computer instructions for handling global errors reported by different types of operating systems in a logical partitioned data processing system. The mechanism of the present invention allows for errors to be gathered at a service focal point and correlated to the different global error through the use of a unique error ID. A set of error IDs is generated for each type of possible global error that could occur on the platform. when a global error occurs, the platform then reports this global error by identifying an appropriate unique error ID and sending this unique error ID to the service focal point.

Additionally, this unique error ID also is sent to the different partitions, which generate error reports, including the unique error ID. These error reports are sent to the service focal point for processing. The error reports are grouped by the service focal point using the unique error ID.

In this manner, the mechanism of the present invention allows for the handling of error reports for global errors reported by different types of operating systems in logical partitioned data processing system. This mechanism avoids requiring the service focal point having to filter out duplicate data and determining which error reports belong to which global errors.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reporting global errors in a logical partitioned data processing system having a plurality of partitions running different types of operating systems, the method comprising:
    responsive to detecting a global error, assigning a unique identifier to the global error;
    sending the unique identifier to a service focal point;
    sending the unique identifier to the plurality of partitions; and
    reporting error information for the global error from the plurality of partitions to the focal point, wherein the plurality of partitions sends error information to the focal point in association with the unique identifier and wherein the focal point identifies error information sent from the plurality of partitions for the global error using the unique identifier, and wherein the global error occurs when a failure exists in a resource shared by the plurality of partitions running different types of operating systems.

2. The method of claim 1, wherein the focal point is a process located on hardware console in communication with the logical partitioned data processing system.

3. The method of claim 1, wherein the assigning step and the sending steps are performed by a service processor on the logical partitioned data processing system.

4. The method of claim 1, wherein the unique identifier is part of a plurality of unique identifiers in which each unique identifier within the plurality of unique identifiers is associated with a particular global error.

5. The method of claim 1, wherein the global error is one of an error in a memory, a power supply failure, a fan failure, or a processor failure.

6. The method of claim 1, further comprising:
    generating an error report for the global error based on error information reported by the plurality of partitions as identified using the unique identifier.

7. The method of claim 1, wherein the error information include information specific to each type operating system operating in the plurality of partitions.

8. The method of claim 1, wherein a partition within the plurality of partitions runs a particular type of operating system that is unable to use the unique identifier and error information is reported without the unique identifier.

9. A method for reporting global errors in a logical partitioned data processing system having a plurality of partitions running different types of operating systems, the method comprising:
    providing a set of unique identifiers, wherein each unique identifier in the set of unique identifiers is associated with a particular global error;
    receiving reports of global errors from the plurality of partitions at a single source, wherein each report includes a unique identifier from the set of unique identifiers, and wherein a particular global error occurs when a failure exists in a resource shared by the plurality of partitions running different types of operating systems and a set of reports for a particular global error is included in the reports; and
    processing a particular global error using only selected reports including a unique identifier corresponding to the particular global error.

10. The method of claim 9, wherein the method is executed in a hardware console in communication with the logical partitioned data processing system.

11. A logical partitioned data processing system for reporting global errors for a plurality of partitions running different types of operating systems, the logical partitioned data processing system comprising:
    assigning means, responsive to detecting a global error, for assigning a unique identifier to the global error;
    first sending means for sending the unique identifier to a service focal point;
    second sending means for sending the unique identifier to the plurality of partitions; and
    reporting means for reporting error information for the global error from the plurality of partitions to the focal point, wherein the plurality of partitions sends error information to the focal point in association with the unique identifier and wherein the focal point identifies error information sent from the plurality of partitions for the global error using the unique identifier, and wherein the global error occurs when a failure exists in a resource shared by the plurality of partitions running different types of operating systems.

12. The logical partitioned data processing system of claim 11, wherein the focal point is a process located on hardware console in communication with the logical partitioned data processing system.

13. The logical partitioned data processing system of claim 11, wherein the assigning step and the sending steps are performed by a service processor on the logical partitioned data processing system.

14. The logical partitioned data processing system of claim 11, wherein the unique identifier is part of a plurality of unique identifiers in which each unique identifier within the plurality of unique identifiers is associated with a particular global error.

15. The logical partitioned data processing system of claim 11, wherein the global error is one of an error in a memory, a power supply failure, or a processor failure.

16. The logical partitioned data processing system of claim 11 further comprising:
generating means for generating an error report for the global error based on error information reported by the plurality of partitions as identified using the unique identifier.

17. The logical partitioned data processing system of claim 11, wherein the error information include information specific to each type operating system operating in the plurality of partitions.

18. The logical partitioned data processing system of claim 11, wherein a partition within the plurality of partitions runs a particular type of operating system that is unable to use the unique identifier and error information is reported without the unique identifier.

19. A data processing system for reporting global errors in a logical partitioned data processing system having a plurality of partitions running different types of operating systems, the data processing system comprising:
providing means for providing a set of unique identifiers, wherein each unique identifier in the set of unique identifiers is associated with a particular global error;
receiving means for receiving reports of global errors from the plurality of partitions at a single source, wherein each report includes a unique identifier from the set of unique identifiers, and wherein a particular global error occurs when a failure exists in a resource shared by the plurality of partitions running different types of operating systems and a set of reports for a particular global error is included in the reports; and
processing means for processing a particular global error using only selected reports including a unique identifier corresponding to the particular global error.

20. The data processing system of claim 19, wherein the data processing system is a hardware console in communication with the logical partitioned data processing system.

21. A logical partitioned data processing system for reporting global errors for a plurality of partitions running different types of operating systems, the data processing system comprising:
a bus system;
a memory connected to the bus system, wherein the memory includes a set of instructions; and
a processing unit connected to the bus system, wherein the processing unit executes the set of instructions to assign a unique identifier to the global error in response to detecting a global error; send the unique identifier to a service focal point; send the unique identifier to the plurality of partitions; and report error information for the global error from the plurality of partitions to the focal point, wherein the plurality of partitions sends error information to the focal point in association with the unique identifier and wherein the focal point identifies error information sent from the plurality of partitions for the global error using the unique identifier, and wherein the global error occurs when a failure exists in a resource shared by the plurality of partitions running different types of operating systems.

22. A data processing system for reporting global errors in a logical partitioned data processing system having a plurality of partitions running different types of operating systems, the data processing system comprising:
a bus system;
a memory connected to the bus system, wherein the memory includes a set of instructions; and
a processing unit connected to the bus system, wherein the processing unit executes the set of instructions to provide a set of unique identifiers, wherein each unique identifier in the set of unique identifiers is associated with a particular global error; receive reports of global errors from the plurality of partitions at a single source, wherein each report includes a unique identifier from the set of unique identifiers, and wherein a particular global error occurs when a failure exists in a resource shared by the plurality of partitions running different types of operating systems and a set of reports for a particular global error is included in the reports; and process a particular global error using only selected reports including a unique identifier corresponding to the particular global error.

23. A computer program product in a computer readable recordable-type medium for reporting global errors in a logical partitioned data processing system having a plurality of partitions running different types of operating systems, the computer program product comprising:
first instructions, responsive to detecting a global error, for assigning a unique identifier to the global error;
second instructions for sending the unique identifier to a service focal point;
third instructions for sending the unique identifier to the plurality of partitions; and
fourth instructions for reporting error information for the global error from the plurality of partitions to the focal point, wherein the plurality of partitions sends error information to the focal point in association with the unique identifier and wherein the focal point identifies error information sent from the plurality of partitions for the global error using the unique identifier, and wherein the global error occurs when a failure exists in a resource shared by the plurality of partitions running different types of operating systems.

24. A computer program product in a computer readable recordable-type medium for reporting global errors in a logical partitioned data processing system having a plurality of partitions running different types of operating systems, the computer program product comprising:
first instructions for providing a set of unique identifiers, wherein each unique identifier in the set of unique identifiers is associated with a particular global error;
second instructions for receiving reports of global errors from the plurality of partitions at a single source, wherein each report includes a unique identifier from the set of unique identifiers, and wherein a particular global error occurs when a failure exists in a resource shared by the plurality of partitions running different types of operating systems and a set of reports for a particular global error is included in the reports; and
third instructions for processing a particular global error using only selected reports including a unique identifier corresponding to the particular global error.

* * * * *